United States Patent [19]

Tani et al.

[11] Patent Number: 5,175,195

[45] Date of Patent: Dec. 29, 1992

[54] PROCESS FOR PRODUCING FLEXIBLE POLYURETHANE FOAM, AND PRODUCTS PRODUCED THEREBY

[75] Inventors: Kensuke Tani; Takaaki Arii, both of Yokohama, Japan

[73] Assignee: 501 Nippon Polyurethane Industry, Co. Ltd., Tokyo, Japan

[21] Appl. No.: 589,093

[22] Filed: Sep. 27, 1990

[30] Foreign Application Priority Data

Oct. 3, 1989 [JP] Japan .................. 1-258557

[51] Int. Cl.⁵ .................. C08G 18/12; C08G 18/24
[52] U.S. Cl. .................. 521/159; 521/163; 521/164; 521/170
[58] Field of Search .............. 521/137, 159, 162, 163, 521/164, 170

[56] References Cited

U.S. PATENT DOCUMENTS

| | | | |
|---|---|---|---|
| 3,968,089 | 7/1976 | Cuscurida et al. | 521/162 |
| 4,256,849 | 3/1981 | Ick et al. | 521/129 |
| 4,263,411 | 4/1981 | Bak | 521/123 |
| 4,373,034 | 2/1983 | Speranza et al. | 521/177 |
| 4,701,476 | 10/1987 | Burchell, Jr. et al. | 528/60 |
| 4,820,743 | 4/1989 | Ishikawa et al. | 521/137 |
| 4,931,487 | 6/1990 | Priester, Jr. et al. | 521/163 |

FOREIGN PATENT DOCUMENTS 57-109820 7/1982 Japan .
58-458 1/1983 Japan .

*Primary Examiner*—John Kight, III
*Assistant Examiner*—John M. Cooney, Jr.
*Attorney, Agent, or Firm*—Davis Hoxie Faithfull & Hapgood

[57] ABSTRACT

A method for producing a flexible polyurethane foam by the reaction of a mixture of an active hydrogen compound, a blowing agent, and an additive with an organic polyisocyanate, where water is used for generating carbon dioxide as the blowing agent; and the organic polyisocyanate is a mixture of (a) an isocyanate-terminated prepolymer prepared by reacting, with diphenylmethane diisocyanate, one or more of alkylene-polyols constituted of ethylene oxide units and an alkylene oxide units of three or more carbon atoms in an addition-polymerization molar-ratio of from 40/60 to 0/100, having an average functionality of three or more, and having an average molecular weight of from 9000 to 30000, and (b) a polyphenylmethane-polyisocyanate, in a mixing ratio of (a) to (b) in the range of from 20/80 to 80/20 by weight.

22 Claims, No Drawings

PROCESS FOR PRODUCING FLEXIBLE POLYURETHANE FOAM, AND PRODUCTS PRODUCED THEREBY

BACKGROUND OF THE INVENTION

1. Field of the Invention

The present invention relates to a process for producing a flexible polyurethane foam. More particularly, the present invention relates to a process for production, employing as the blowing agent carbon dioxide which is generated by the reaction of water with free isocyanate groups, of a flexible polyurethane foam which has high elasticity and excellent extension properties, and which is useful for cushioning materials for automobiles, furniture and the like.

2. Related Background Art

Flexible polyurethane foams are used in a great quantity for cushioning materials for automobiles, furniture and the like.

For the isocyanate component for the preparation of such flexible polyurethane foams, usually used is tolylene diisocyanate solely or a mixture of tolylene diisocyanate and polyphenylmethane-polyisocyanates.

Tolylene diisocyanate and its analogues, however, involve problems in industrial hygiene because of its high vapor pressure, and are inferior in curing behavior. Further, the foams prepared therefrom have not satisfactory properties such as large compression set especially under wet and hot conditions, so that such foams are considered not to be suitable for uses like a seat-cushioning material. Under such circumstances, diphenylmethane diisocyanates have recently come to be solely utilized for production of flexible polyurethane foams.

In production of flexible polyurethane foams, water is used as a carbon-dioxide-generating agent in combination with a chlorofluorocarbon as an auxiliary blowing agent to help the blowing action of carbon dioxide. Since the use of chlorofluorocarbons has come to be severely criticized all over the world, methods are now being investigated for producing a flexible polyurethane foam by employing carbon dioxide, which is generated by the reaction of water with free isocyanate groups, as a substantially sole blowing agent. The single use of diphenylmethane diisocyanates for producing a flexible polyurethane foam involves a disadvantage that a low density foam material is not readily produced without use of auxiliary blowing agent in addition to water.

Moreover, polyetherpolyols used for flexible polyurethane foams have usually an average functionality of from 2 to 4, and an average molecular weight of from 2000 to 8000. The foams produced according to the prepolymer method by use of such a polyol have been desired to be improved further in properties of elasticity, elongation, etc.

SUMMARY OF THE INVENTION

The present invention intends to provide a method for producing a low-density flexible polyurethane foam by employing carbon dioxide, which is generated by the reaction of water with free isocyanate groups, substantially as the sole blowing agent, and diphenylmethane diisocyanates as the sole organic polyisocyanate without impairing the properties of the foam thus prepared.

As the results, it is now found that the intended effect is achieved by use of an isocyanate-terminated prepolymer prepared by the reaction of diphenylmethane diisocyanates containing 5-50% by weight of a 2,2'- and 2,4'-isomer mixture with alkylene polyols having a specified composition, and polyphenylmethane-polyisocyanates in a mixing ratio in the range of from 20/80 to 80/20 by weight. The remainder in the diphenylmethane diisocyanates is 4,4'-isomer.

The present invention provides a method for producing a flexible polyurethane foam by the reaction of a mixture of an active hydrogen compound, a blowing agent, and an additive with an organic polyisocyanate, where water is used for generating carbon dioxide as the blowing agent; and the organic polyisocyanate is a mixture of (a) an isocyanate-terminated prepolymer prepared by reacting, with diphenylmethane diisocyanate, one or more of alkylene-polyols constituted of ethylene oxide units and an alkylene oxide units of three or more carbon atoms in an addition-polymerization molar-ratio of from 40/60 to 0/100, having an average functionality of three or more, and having an average molecular weight of from 9000 to 30000, and (b) a polyphenylmethane-polyisocyanate, in a mixing ratio of (a) to (b) in the range of from 20/80 to 80/20 by weight.

DETAILED DESCRIPTION OF THE PREFERRED EMBODIMENT

In the production of a flexible polyurethane foam according to the present invention, the organic polyisocyanate is a mixture of (a) an isocyanate-terminated prepolymer prepared by the reaction of diphenylmethane diisocyanate containing 5-50% by weight of 2,2'- and 2,4'-isomer mixture with one or more of alkylene-polyols constituted of ethylene oxide units and an alkylene oxide units of three or more carbon atoms in an addition-polymerization molar-ratio of from 40/60 to 0/100, having an average functionality of three or more, and having an average molecular weight of not lower than 9000, preferably from 10000 to 30000, and (b) a polyphenylmethane-polyisocyanate containing diphenylmethane diisocyanate at a content of 25 to 75% by weight, in a mixing ratio of (a) to (b) in the range of from 20/80 to 80/20. The flexible polyurethane foam is produced by reacting and foaming the mixture composed of the organic isocyanate mentioned above, water for generating carbon dioxide as the blowing agent, an active hydrogen compound and additives generally known in production of flexible polyurethane foams.

The resulting flexible polyurethane foam has high elasticity and excellent elongation properties, and can be made low-density even by using diphenylmethane diisocyanates soly without using an auxiliary blowing agent.

The active hydrogen compound used in the present invention can be prepared by reacting a polyol or an amine with an alkylene oxide. The polyol includes ethylene glycol, diethylene glycol, triethylene glycol, 1,2-propylene glycol, trimethylene glycol, tetramethylene glycol, hexamethylene glycol, glycerol, diglycerol, sorbitol, pentaerythritol, sucrose, bisphenol A, triethanolamine, and the like. The amine includes ethylene-diamine, tolylenediamine, and the like. These may be used alone or as a mixture of two or more thereof. The active hydrogen compounds can be prepared by addition-polymerization of an alkylene oxide onto a polyol or an amine as an initiator according to a conventional manner.

The additive which may be used in the present invention includes a catalyst, a foam stabilizer, and if necessary, a flame retardant, a viscosity modifier, and the like.

The catalyst includes tertiary amines such as dimethylethanolamine, triethylenediamine, tetramethylpropanediamine, tetramethylhexamethylediamine, dimethylcyclohexylamine, and the like; organic tin compounds such as stannous octoate, dibutyltin dilaurate, and the like.

The foam stabilizers include various siloxanepolyalkylene oxide block copolymers, the kind of which is selected depending on the formulation recipe.

The flame retardant includes tris(chloroethyl) phosphate, tris(chloropropyl) phosphate, tricresyl phosphate, chlorinated paraffin, and the like.

The viscosity modifier includes dibutyl phthalate, dioctyl phthalate, alkylene carbonates, and the like.

The alkylene polyol constituting the isocyanate-terminated prepolymer (a) used in the present invention is represented by the general formula (1):

$$Z[(RO)_nH]_m \qquad (1)$$

where Z is a residue of the starting substance, R is a residue of an alkylene oxide, n is a number of moles of an alkylene oxide or alkylene oxide added, m is a number of active hydrogen in the starting substance molecule; or an intermolecular or intramolecular condensate formed from the above polyol or polyols by linking with a bonding agent or a peroxide (or a radical-initiating catalyst): and the like.

Such an alkylene polyol is constituted of ethylene oxide units and an alkylene oxide units of three or more carbon atoms in a molar ratio of addition polymerization of from 40/60 to 0/100, having an average functionality of three or more, and having an average molecular weight of not lower than 9000, preferably from 10000 to 30000. The alkylene polyol may be used alone or as a mixture of two or more thereof. Sorbitol, sucrose, pentaerythritol, glycerol, or the like may be used as the initiator, and may be used mixedly if the mixture satisfies the requirements for alkylene polyol as a modifier: namely the alkylene polyols derived from a mixture of the abovementioned initiators can be used, if the alkylene polyols satisfy the average molar ratio of addition polymerization, the average functionality, and the average molecular weight of the alkylene polyol.

Such an alkylene polyol having a high molecular weight and a high functionality as employed in producing a flexible polyurethane foam according to the present invention have not been used hitherto as a modifier for isocyanates. In particular, the selection of the alkylene polyol according to the present invention is extremely unique in the process for producing a flexible polyurethane foam which employs diphenylmethane diisocyanates singly, which has a short history, and water for generating carbon dioxide as a substantial blowing agent.

In the process for producing a flexible polyurethane foam of the present invention, as a modifier for diphenylmethane diisocyanates, a specified alkylene polyol, namely an alkylene polyol constituted of ethylene oxide units and an alkylene oxide units of three or more carbon atoms in an addition-polymerization molar-ratio of from 40/60 to 0/100, having an average functionality of three or more, and having an average molecular weight of not lower than 9000, preferably from 10000 to 30000, singly or a mixture of two or more thereof, has solved the problems occuring in use of diphenylmethane diisosyanates as the isocyanate component and water for generating carbon dioxide as the blowing agent: namely problems of difficulty in getting low density, and disadvantages of low impact resistance, inferior tear properties, low elongation, etc.

The present invention is described in more detail referring to examples without limiting the invention in any way. The parts and % in the examples are respectively "parts by weight" and "% by weight" unless otherwise mentioned.

PREPARATION 1

SYNTHESIS OF AN ORGANIC POLYISOCYANATE 700 parts of diphenyl methane diisocyanate containing 2,2'- and 2,4'-isomer mixture at a content of 18.6% were reacted with 212 parts of an adduct of alkylene oxides to sucrose (EO/PO=20/80, average molecular weight: 20000) at 80° C. for 3 hours to prepare an isocyanate-terminated prepolymer. The isocyanate content thereof was 24.1%. To this prepolymer, 300 parts of a polyphenylmethane-polyisocyanate containing diphenylmethane diisocyanates at a content of 36.0%, and stirred for further one hour, to prepare an organic polyisocyanate (A) to be subjected to foaming test. The NCO content thereof was 26.5%.

PREPARATIONS 2-6

SYNTHESIS OF ORGANIC POLYISOCYANATE

Organic polyisocyanates (B) to (F) to be tested for foaming were synthesized from various diphenylmethane diisocyanates and modifying polyols under the same conditions as those in Preparation 1.

The organic polyisocyanates (B) to (E) correspond to examples of the present invention, and the organic polyisocyanate (F) corresponds to a comparative example.

Table 1 shows the starting material compositions and the amounts used in the preparation of the organic polyisocyanates.

From the above-described organic polyisocyanates (A) to (F), flexible polyurethane foams were produced. The formulations therefor are shown in Table 2. The expansion speeds and foam properties of the molded foams are shown in Table 3.

TABLE 1

| Organic isocyanate | | | | (A) | (B) | (C) | (D) | (E) | (F) |
|---|---|---|---|---|---|---|---|---|---|
| Diphenylmethane diisocyanate | | Isomer content (%) | | 18.6 | 30.2 | 26.1 | 42.5 | 30.2 | 30.2 |
| | | Amount (parts) | | 700 | 550 | 550 | 700 | 600 | 600 |
| Modifying polyol Amount (parts) | EO content | M.W. | f | | | | | | |
| | 20% | 20000[1] | 8 | 212 | 223 | 160 | | | |
| | 0% | 4000[2] | 2 | | | 40 | | | |
| | 15% | 15000[3] | 4 | | | | 262 | | |
| | 17% | 13500[4] | 3 | | | | | 226 | |
| | 0% | 3000[5] | 2 | | | | | | 220 |
| Isocyanate-terminated Prepolymer (NCO content %) | | | | 24.1 | 23.9 | 24.0 | 23.8 | 24.1 | 23.8 |
| Polyphenylmethane- | | Diisocyanate content (%) | | 36.4 | 45.2 | 45.2 | 36.4 | 52.0 | 52.0 |

TABLE 1-continued

| Organic isocyanate | | (A) | (B) | (C) | (D) | (E) | (F) |
|---|---|---|---|---|---|---|---|
| polyisocyanate | Amount (parts) | 300 | 450 | 450 | 300 | 400 | 400 |
| | Isocyanate content (%) | 26.5 | 26.7 | 26.5 | 26.3 | 26.5 | 26.3 |

[1] Sannix FA 934, made by Sanyo Kasei Co., Ltd., trade name
[2] Sannix PP 4000, made by Sanyo Kasei Co., Ltd., trade name
[3] Laboratory product
[4] Laboratory product
[5] Exenol EL-3020, made by Asahi Glass Co., Ltd.

TABLE 2

| | | No. | | | | | | | | |
|---|---|---|---|---|---|---|---|---|---|---|
| | | Example | | | | | | | Comparative example | |
| Item | | 1 | 2 | 3 | 4 | 5 | 6 | 7 | 1 | 2 |
| Formulation (parts) | Polyetherpolyol (a)[1] | 100 | | 100 | | 100 | 100 | 100 | 100 | |
| | Polyetherpolyol (b)[2] | | 100 | | 100 | | | | | 100 |
| | Polyetherpolyol (c)[3] | | 5 | | 5 | | | | | 5 |
| | Polyetherpolyol (d)[4] | 5 | | 5 | | 5 | 5 | 5 | 5 | |
| | Water | 3.5 | 3.5 | 3.8 | 3.8 | 3.8 | 3.8 | 3.8 | 3.8 | 3.8 |
| | TOYOCAT ET[5] | 0.1 | 0.1 | 0.1 | 0.1 | 0.1 | 0.1 | 0.1 | 0.1 | 0.1 |
| | TEDA L-33[5] | 1.0 | 0.8 | 0.7 | 0.7 | 0.6 | 0.8 | 0.8 | 0.4 | 0.6 |
| | Foam stabilizer (A)[6] | | | 0.5 | 0.5 | 0.5 | 0.5 | 0.5 | 0.5 | 0.5 |
| | Foam stabilizer (B)[7] | 0.5 | 0.5 | | | | | | | |
| Organic polyisocyanate | | (A) | (A) | (B) | (B) | (C) | (D) | (E) | (F) | (F) |
| Isocyanate index | | 100 | 100 | 90 | 90 | 90 | 90 | 90 | 90 | 90 |

[1] f = 3, $\overline{MW}$ = 6000, EO content = 15%
[2] f = 3, $\overline{MW}$ = 7000, EO content = 10%
[3] f = 4, $\overline{MW}$ = 8400, EO content = 80%
[4] f = 2, $\overline{MW}$ = 4700, EO content = 80%
[5] Catalyst, made by Tosoh Corp.
[6] Made by Goldschmidt Co., B-4113
[7] Made by Nippon Unicar K.K. SZ-1306

TABLE 3

| | | Example | | | | | | | Comparative example | |
|---|---|---|---|---|---|---|---|---|---|---|
| | | 1 | 2 | 3 | 4 | 5 | 6 | 7 | 1 | 2 |
| Foaming rate (second) | Cream time | 9 | 9 | 8 | 9 | 10 | 8 | 8 | 12 | 11 |
| | Gel time | 51 | 62 | 59 | 60 | 79 | 59 | 56 | 101 | 76 |
| | Rise time | 88 | 91 | 87 | 90 | 101 | 85 | 84 | 133 | 96 |
| | Free rise density (kg/m³) | 41.2 | 40.8 | 39.1 | 39.7 | 38.6 | 37.5 | 39.2 | 44.2 | 43.6 |
| Foam[1] properties | Overall density (kg/m³)[2] | 52.1 | 51.6 | 50.6 | 49.7 | 50.5 | 47.4 | 49.2 | 55.6 | 54.5 |
| | 25% ILD (kg/200 mm diam.)[2] | 19.3 | 19.5 | 20.0 | 20.6 | 20.5 | 18.5 | 20.1 | 20.6 | 20.1 |
| | Impact resilience (%)[2] | 64.5 | 63.0 | 64.0 | 65.5 | 63.5 | 65.0 | 62.5 | 56.6 | 55.5 |
| | Tensile strength (kg/cm²)[3] | 1.44 | 1.41 | 1.35 | 1.37 | 1.46 | 1.52 | 1.59 | 1.31 | 1.21 |
| | Elongation (%) | 130 | 126 | 124 | 127 | 132 | 144 | 149 | 115 | 110 |
| | Tear strength (kg/cm)[3] | 0.80 | 0.77 | 0.76 | 0.78 | 0.81 | 0.81 | 0.91 | 0.66 | 0.62 |
| | 50%-compression strain[2] at original state (%) (Thickness change rate) | 2.9 | 4.1 | 3.8 | 3.9 | 4.0 | 4.2 | 4.5 | 8.2 | 7.4 |

[1] Molded product, 300 · 300 · 100 mm, Mold temperature: 50° C., Mold release: 4 min.
[2] JIS K 6401
[3] JIS K 6301

We claim:

1. An improved low density, flexible polyurethane foam produced from the reaction of a mixture of an active hydrogen compound, an organic polyisocyanate, an additive, and water, wherein the improvement comprises the use of water for generating carbon dioxide as a blowing agent substantially in the absence of other blowing agents, and wherein the organic polyisocyanate is a mixture of (a) from about 20% by weight to about 80% by weight based on 100% by weight of the polyisocyanate component of an isocyanate-terminated prepolymer prepared by reacting an alkylene polyol with diphenylmethane diisocyanate, wherein the alkylene polyol is constituted of alkylene oxide units of three or more carbon atoms and optionally ethylene oxide units, in an addition-polymerization molar-ratio of from about 60/40 to about 100/0, wherein the alkylene polyol further has an average molecular weight of from about 9,000 to about 30,000 and has an average functionality of three or more, and wherein the diphenylmethane diisocyanate constituent of the prepolymer comprises
  (i) from about 5% by weight to about 50% by weight of a mixture of 2,2'- and 2,4'-isomers, and
  (ii) from about 95% by weight to about 50% by weight of 4,4'-isomer with (i) and (ii) being based on 100% by weight of the diphenylmethane diisocyanate constituent of the prepolymer; and (b) from about 80% by weight to about 20% by weight based on 100% by weight of the polyisocyanate component of a polyphenylmethane-polyisocyanate.

2. The foam of claim 1 wherein the polyphenylmethane-polyisocyanate comprises from about 25% by weight to about 75% by weight of diphenylmethane diisocyanate.

3. The foam of claim 1 wherein the active hydrogen compound is prepared from the reaction of an alkylene oxide with a reactant selected from the group consisting of polyols, amines, and mixtures thereof.

4. The foam of claim 3 wherein the polyol is selected from the group consisting of ethylene glycol, diethylene glycol, triethylene glycol, 1,2-propylene glycol, trimethylene glycol, tetramethylene glycol, hexamethylene glycol, glycerol, diglycerol, sorbitol, pentaerythritol, sucrose, bisphenol A, and triethanolamine.

5. The foam of claim 3 wherein the amine is ethylenediamine or tolylenediamine.

6. The foam of claim 1 wherein the additive is selected from the group consisting of catalysts, foam stabilizers, flame retardants, viscosity modifiers, and mixtures thereof.

7. The foam of claim 1 wherein the additive is a catalyst selected from the group consisting of tertiary amines, organic tin compounds, and mixtures thereof.

8. The foam of claim 7 wherein the tertiary amine is selected from the group consisting of dimethylethanolamine, triethylenediamine, tetramethylpropanediamine, tetramethylhexamethylenediamine, and dimethylcyclohexylamine.

9. The foam of claim 7 wherein the organic tin compound is stannous octoate or dibutyltin dilaurate.

10. The foam or claim 6 wherein the foam stabilizer is a siloxane-polyalkylene oxide block copolymer.

11. The foam of claim 1 wherein the alkylene polyol constituent of the prepolymer has an average molecular weight of from about 10000 to about 30000.

12. An improved method for producing a low density, flexible polyurethane foam by the reaction of a mixture of an active hydrogen compound, an organic polyisocyanate, an additive, and water, wherein the improvement comprises using water for generating carbon dioxide as a blowing agent, substantially in the absence of other blowing agents, and wherein the organic polyisocyanate is a mixture of
   (a) from about 20% by weight to about 80% by weight based on 100 % by weight of the polyisocyanate component of an isocyanate-terminated prepolymer prepared by reacting an alkylene polyol with diphenylmethane diisocyanate, wherein the alkylene polyol is constituted of alkylene oxide units of three or more carbon atoms and optionally ethylene oxide units, in an addition-polymerization molar-ratio of from about 60/40 to about 100/0, wherein the alkylene polyol further has an average molecular weight of from about 9,000 to about 30,000 and has an average functionality of three or more, and wherein the diphenylmethane diisocyanate constituent of the prepolymer comprises
   (i) from about 5% by weight to about 50% by weight of a mixture of 2,2'- and 2,4'-isomers, and
   (ii) from about 95% by weight to about 50% by weight of 4,4'-isomer with (i) and (ii) being based on 100% by weight of the diphenylmethane diisocyanate constituent of the prepolymer; and
   (b) from about 80% by weight to about 20% by weight based on 100 % by weight of the polyisocyanate component of a polyphenylmethane-polyisocyanate.

13. The method of claim 12 wherein the polyphenylmethane-polyisocyanate comprises from about 25% by weight to about 75% by weight of diphenylmethane diisocyanate.

14. The method of claim 12 wherein the active hydrogen compound is prepared from the reaction of an alkylene oxide with a reactant selected from the group consisting of polyols, amines, and mixtures thereof.

15. The method of claim 14 wherein the polyol is selected from the group consisting of ethylene glycol, diethylene glycol, triethylene glycol, 1,2-propylene glycol, trimethylene glycol, tetramethylene glycol, hexamethylene glycol, glycerol, diglycerol, sorbitol, pentaerythritol, sucrose, bisphenol A, and triethanolamine.

16. The method of claim 14 wherein the amine is ethylenediamine or tolylenediamine.

17. The method of claim 12 wherein the additive is selected from the group consisting of catalysts, foam stabilizers, flame retardants, viscosity modifiers, and mixtures thereof.

18. The method of claim 12 wherein the additive is a catalyst selected from the group consisting of tertiary amines, organic tin compounds, and mixtures thereof.

19. The method of claim 18 wherein the tertiary amine is selected from the group consisting of dimethylethanolamine, triethylenediamine, tetramethylpropanediamine, tetramethylhexamethylenediamine, and dimethylcyclohexylamine.

20. The method of claim 18 wherein the organic tin compound is stannous octoate or dibutyltin dilaurate.

21. The method of claim 17 wherein the foam stabilizer is a siloxane-polyalkylene oxide block copolymer.

22. The method of claim 12 wherein the alkylene polyol constituent of the prepolymer has an average molecular weight of from about 10000 to about 30000.

* * * * *